March 4, 1941.  G. F. MOORE  2,233,956

PROCESS FOR THE MANUFACTURE OF PHOSPHORIC ACID

Filed Dec. 1, 1938  2 Sheets—Sheet 1

INVENTOR
GEORGE F. MOORE
BY
ATTORNEY

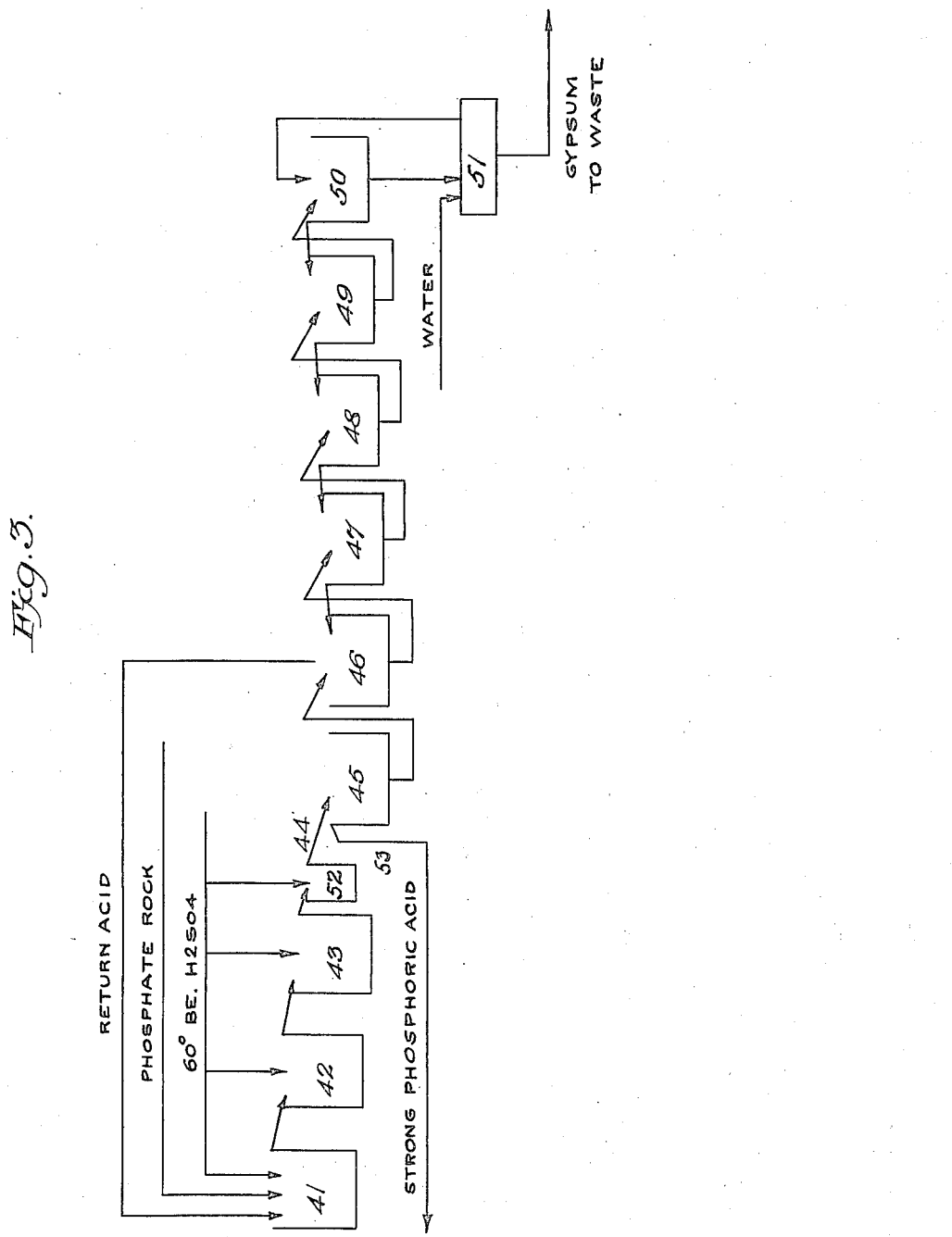

Patented Mar. 4, 1941

2,233,956

UNITED STATES PATENT OFFICE 2,233,956

PROCESS FOR THE MANUFACTURE OF PHOSPHORIC ACID

George F. Moore, Tampa, Fla., assignor to U. S. Phosphoric Products Corporation, New York, N. Y., a corporation of Delaware Application December 1, 1938, Serial No. 243,309

6 Claims. (Cl. 23—165)

The present invention relates to improvements in the processes of making phosphoric acid, and, more particularly, to a method of controlling the rate of settling of the solids formed in the continuous countercurrent decantation process of making phosphoric acid involving the treatment of phosphate rock with sulphuric acid.

Many processes have been used for making phosphoric acid but the one in largest commercial use is the continuous countercurrent decantation system. In this system as usually practiced, three agitator tanks are arranged in series, the last tank delivering into the first of a series of decanters. Ground phosphate pebble or rock is mixed with sulphuric acid of 75% strength diluted to 31 to 35% strength with water or dilute phosphoric acid of about 15% strength which is obtained as a product at another stage of the operation. No heat is applied but an amount of heat sufficient to raise the temperature of the mixture to 140° to 150° F. is generated in the process by the chemical reaction. The mixture is formed in the first agitator tank and passes from it into the second and then into the third agitator tank. The mass is stirred vigorously in each of the tanks by means of rotating paddles or air blast or both.

The overflow from the third and last agitator then passes into the first of the series of decanters. The solids pass progressively through the decanters and water flows through the decanters in the opposite direction to the course of the solids. Dilute phosphoric acid is drawn off from the first decanter and concentrated and the heavy sludge is drawn off from the last decanter and sent to the waste pile or, in the best of modern practices, filtered or centrifuged.

The phosphate rock consists primarily of tricalcium phosphate [Ca$_3$(PO$_4$)$_2$] which reacts with sulphuric acid to form phosphoric acid and calcium sulphate according to the following equation:

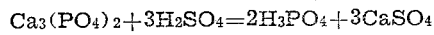

$$Ca_3(PO_4)_2 + 3H_2SO_4 = 2H_3PO_4 + 3CaSO_4$$

The calcium sulphate usually crystallizes out with two molecules of water of crystallization and is known as gypsum.

In the industrial practice of the process outlined hereinabove, difficulties have arisen due to variations and irregularities in the speed of settling of the solids in the decanters and particularly with respect to the gypsum which forms the major part of the solids. If the solids settle too fast, they form too thick a mud which loads the rakes of the thickeners and clogs the pipe lines and the pumps, often resulting in shutdowns of the plant. If the solids do not settle rapidly enough, suspended solids may decant with the phosphoric acid from the first decanter making the purification and concentration of the phosphoric acid more difficult and expensive; at the same time, the sludge comprising the solids will be too liquid and will carry phosphoric acid away with it with consequent loss of phosphoric acid from the system, and the sludge reaching the filters or centrifuges will be of such a character as to be difficultly filterable, with a consequent decrease in the capacity and efficiency of the filters and of the plant. However, the most serious effect of the too slow settling of the solids is that this mass of finely divided and highly suspended solids will after a time settle very rapidly in the decanter, caused by a heavier crystal product from the agitator, thereby overloading it and the pump generally used for removing the sludge therefrom, thus bringing about a shut-down of the plant until this overload can be removed. These disadvantages then result, as above pointed out, from the too rapid or too slow settling of the suspended solids which primarily consist of crystals of calicum sulphate.

In U. S. Patent No. 1,940,689 I have described an improvement in the continuous countercurrent decantation process for making phosphoric acid in which the size of the calcium sulfate crystals is controlled and the rate of settling of the crystals regulated thereby. As is well known in the art, it is possible to control the speed of reaction and therefore the size of the calcium sulphate crystals formed to some extent by regulation of the temperature, concentration and the amount of sulphuric acid. These methods of control are, however, insufficient to obtain the control desired. Moreover, such methods are costly and inefficient and require expensive apparatus and modification of existing apparatus. Also, when it is attempted to control the speed of the reaction by control of the concentration and the amount of the sulphuric acid, new problems in the purification of the phosphoric acid are met with and there is great danger of loss of phosphoric acid. Furthermore, it has been found, through years of experimentation and development, that the temperature, concentration and amount of sulphuric acid as commonly used in the Dorr system is the most efficient and satisfactory and that any substantial variation in any of these elements produces a correspondingly substantial decrease in the efficiency of the process and there are limits to the variations which can be made in these elements in any case which cannot be exceeded and still retain a practically operative process.

It is well known in the art that the preferred size of the crystals of calcium sulfate may be determined with facility by withdrawing a predetermined volume, say 1000 cc. of the overflow from the third agitator at the exit thereof into a suitable container, say a 1000 cc. graduate, and allowing it to stand for 30 minutes. If the calcium sulphate crystals are of the right size, the settled solids will fill the graduate to about the 750 cc. mark. This line of demarcation between the settled solids and the supernatant liquor can be easily read. This will be called the 75% settling test. If the settling test is between 70% and 80%, that is, if the line of demarcation between the settled solids and the supernatant liquid lies between 700 and 800 cc. the size of the calcium sulphate crystals may be considered to be of substantially the correct size and the plant may be expected to operate without difficulty. In other words, such crystals are of an optimum size for settling.

If, on the other hand, the settling test is above 80%, then the crystals are too small and the grinding is not fine enough and the difficulties due to too small crystals will soon show themselves. If the settling test is between 60 and 70%, the crystals are too large and the difficulties due to too coarse crystals will soon show themselves. It will be understood that, where the crystals are small, they are light and occupy a large space and do not settle into a compact mass very rapidly thus causing a high reading, while, where they are large, they are more compact and heavier, rapidly settling to a compact mass.

While the samples for the tests made according to this second described method of testing are preferably taken from the overflow from the third agitator tank at its exit, it is apparent that the samples may be taken from the overflow of either the first or second agitator tanks allowing for the difference in the condition of the material at these points. For example, if the samples are taken from the overflow from the second agitator tank, the settling test will give a reading of 4 to 5% higher than when the samples are taken from the overflow of the third tank. However, when the samples are taken from other points than at the overflow from the third agitator tank, the tests will give a less accurate and efficient control of the process.

As more fully described in U. S. Patent No. 1,940,689, the reaction between the phosphate rock and sulphuric acid is retarded by coarser grinding, increase of phosphate rock feed, bypassing of an agitator, feeding some of the rock into No. 2 agitator, and splitting the sulphuric acid to No. 1 and No. 2 agitators, all of which are used to retard the reaction and produce a crystal for uniform rate of settling. For a crystal so small that it settles too slow, makes a large volume, and is hard to separate from the phosphoric acid; fine grinding, decrease of feed, etc., are used to produce a larger crystal. Also, if installed, the Dorr recirculation system can be used to densify the crystals.

As is well known in the art, wet rock may be acidulated to form phosphoric acid. The wet rock is ground in any suitable manner, say in a grinding mill, and introduced into an agitator together with suitable amounts of process acid and 60° Bé. sulphuric acid. The mixture passes from the first agitator through a series of agitators or mixers, usually two in number, and is discharged into the first of a series of thickeners or decanters. In the first thickener the discharge of the last agitator or mixer is thickened from about 30% solids to about 45% solids by weight and a liquid overflow of phosphoric acid of about 26° Bé. drawn off. The solids are discharged from the first decanter into a second, third and so forth until the phosphoric acid content of the thickened slurry is suitably low. The thickened discharge of the last thickener or decanter, of which there may be as many as 6 or more, is filtered and washed with fresh water. The filter cake is discharged to waste or for use in the arts while the wash water and acid from the filter is used to wash the solids in the decanters in a counter current fashion. The overflow from the second decanter after the agitators is weak phosphoric or process acid of about 18° Bé. and is used in the first agitator or mixer while the overflow of the first decanter is phosphoric acid of about 26° Bé. At times for rocks that do not go into solution easily it is desirable to recirculate the slurry before decantation. At such times the slurry from the last agitator or mixer is returned to the first mixer through a plurality of premixers where sufficient sulfuric acid is added to bring the content of free sulfuric acid in the slurry to about 5% or more.

It has been discovered that contrary to the belief of those skilled in the art the large crystal is not formed instantaneously on solution but is formed in the process of going through the agitators by the action of the sulphuric acid or the small amount of excess sulphuric acid in the three agitators. This takes place under normal conditions, that is, when the slurry is allowed to discharge out of No. 3 agitator with the normal amount of sulphuric acid to form free phosphoric acid with the $P_2O_5$ therein contained. With the small pebble rock and wet grinding, the remedies named in Patent No. 1,940,689 are sufficient to overcome any trouble with a large crystal; because the feed can be increased sufficiently, and the grinding can be changed very drastically. The dry-grinding is finer, also the larger pebble of rock, Florida rock, is more porous than the small pebble, limits of coarse grinding, and increase of feed are much less variable than with the small pebble. In the case of seven tons ground as coarse as the mill could be adjusted, all the remedies in Patent No. 1,940,689 proved futile in obtaining a crystal light and small enough to not load the thickener rake. This was under conditions when the normal amount of sulphuric acid was added; to give a ratio of 1.96 to 2.00 with the methyl orange and phenolpthalein titration test. If sufficient acid was added in the first agitator, all the rock went into solution in the first agitator and no raw rock could be obtained in the second and third agitators. None of the remedies in Patent No. 1,940,689 would work with a constant feed of dry rock.

Crystals for good pumping and good separation of the $P_2O_5$ in the Dorr system must be of such size and density that they will settle fast enough to leave the liquid overflows clear and rapidly enough to give good thick pumping, but they should not settle fast enough to load the rake before it can pull the slurry into the cone for pumping. This is what happens when the crystals are oversize. When the term "crystals of calcium sulfate having an optimum size for settling" is used in the claims, I mean crystals of such size and density that they will settle fast enough to leave overflows clear and settle rapidly enough to give good thick pumping.

It has now been found that the difficulties arising in the acidulation of dry rock and easily soluble rock can be overcome without increasing the grinding facilities which have been satisfactory in wet grinding in a completely satisfactory manner to produce phosphoric acid on an industrial scale from coarse phosphate rock ground under dry grinding conditions and easily soluble rock ground wet.

It is an object of the present invention to provide a method for acidulating coarse phosphate rock having greater porosity than small phosphate rock and screenings to produce phosphoric acid, and for wet screenings of easily soluble nature.

It is another object of the present invention to provide a method for acidulating phosphate rock to produce phosphoric acid wherein the sulfuric acid is added in portions.

It is a further object of the present invention to provide a method for acidulating phosphate rock to produce phosphoric acid wherein the size of the crystals of calcium sulfate produced in the process is controlled by reducing the time of contact between the crystals of calcium sulfate and sulfuric acid.

The present invention also contemplates the provision of a process for the production of phosphoric acid by the continuous decantation method wherein the load on the rakes of the decanters is controlled by regulation of the time of contact of the crystals of calcium sulfate and sulfuric acid.

Other objects and advantages will become apparent from the following description taken in conjunction with the drawings, in which:

Fig. 3 is a more or less diagrammatic representation of a preferred embodiment of the present invention.

Figure 1:
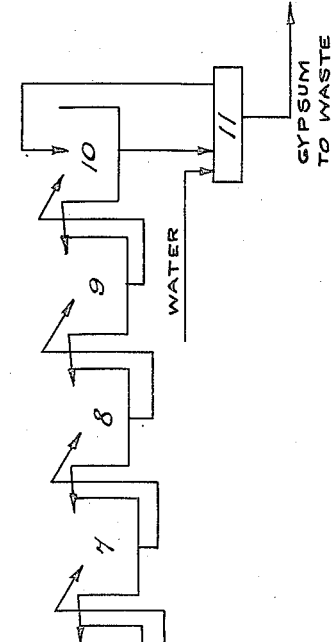
Fig. 1 is a more or less diagrammatic representation of a well known continuous decantation process for the production of phosphoric acid involving the wet grinding of small particle phosphate rock.

Fig. 1 is a flow-sheet of a process for producing phosphoric acid by the continuous decantation method wherein phosphate rock, such as small pebble rock or washer screenings, is wet-ground to the desired fineness. As described in U. S. Patent No. 1,940,689 it is preferred to grind the phosphate rock to that degree of fineness in which about 3.5% to about 4% by volume of the sludge from the mill will be retained on a 60 mesh screen. If more than about 4.5% by volume of the rock is left on the 60 mesh screen, the calcium sulfate crystals will be too small. If the quantity of rock left on the 60 mesh screen is about 3% or less the grinding has been too fine and the resulting calcium sulfate crystals will be too large. When a harder rock is used the grinding should be finer and of such degree that only about 1% will be retained by a 60 mesh screen with the hardest phosphate rock. Softer phosphate may be ground correspondingly coarser. In Fig. 1 the grinding equipment is not indicated and the flow sheet begins with the introduction of the ground rock, weak phosphoric acid and 60° Bé. sulfuric acid into the first of a series of agitators, 1. From there the slurry, consisting of phosphoric acid, calcium sulfate crystals, sand and some undecomposed rock, flows by gravity from the top into agitator 2; and from agitator 2 to agitator 3, and from agitator 3 into a trough 4, and discharges into the first thickener 5. The thickener is equipped with a slow-moving rake which moves the thickened slurry, thickened from about 30% solids to 45%, to the center of the thickener. In the center of the thickener and at the bottom, a wiper is attached to the rakes. This wiper keeps a small cone cut for reception of three or four tons of thickened slurry. The thickened slurry is pumped from bottom of 5 and discharged into a trough discharging into thickener 6. This process is kept up for each succeeding thickener until the slurry is in the last thickener 10. From here it is pumped to a filter 11, say an Oliver rotary filter, where it is well washed with water, and then the gypsum cake is pumped to the field pile.

The water and acid recovered by filter 11 are returned to 10, from 10 to 9, from 9 to 8, from 8 to 7, from 7 to 6, and from 6 to wet mills and agitator 1. The overflow from 5, 26° Bé. phosphoric acid, is the production. In Fig. 1, all the return phosphoric acid, 18° Bé., all the sulphuric acid, and the phosphate rock is put in agitator 1, in which most of the reaction occurs. Fig. 1 also shows the Dorr recirculation system. In the recirculation system, the gypsum slurry is taken from the top of agitator 3 and pumped to small pre-mixers 12 where the gypsum slurry is treated with strong sulfuric acid until the slurry contains 5% or more free sulfuric acid. This slurry is then repassed through the agitators. The Dorr recirculation system may be used when the gypsum crystals being discharged from agitator 3 are too small. When the crystals are too large, the recirculation may be cut out. In operation with wet screenings, usually the rock, return acid, and sulfuric acid were all put in agitator 1 and during most of the operating time the recirculation system is used.

Figure 2:
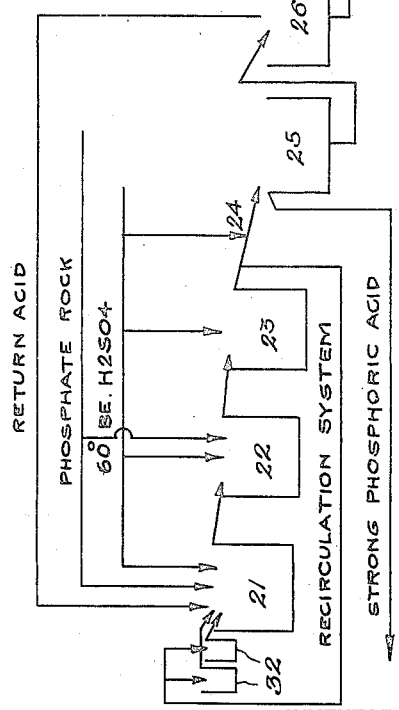
Fig. 2 is a diagrammatic representation of a process for producing phosphoric acid by the continuous decantation method embodying the principles of the present invention.

In Fig. 2 a flow-sheet of a process for producing phosphoric acid by the continuous decantation process embodying the principles of the present invention is depicted. Dry rock is ground to the desired coarseness and together with weak return phosphoric acid from succeeding operations and sulfuric acid of the proper concentration known to those skilled in the art introduced into mixer 21. As clearly indicated, a portion of the ground rock is introduced into the reactor 22 together with a portion of the sulfuric acid. Further portions of the sulfuric acid are introduced into the third reactor or mixer 23 in the series and the remainder into a trough 24 by means of which the discharge of mixer 23 is conveyed to decanter 25. While the ratio of the amount of rock introduced into agitator or mixer 21 and the quantity of rock introduced into reactor or mixer 22 is preferably about one to about one, this ratio may be varied as those skilled in the art will appreciate. While it is preferred to add about 40% of the necessary sulfuric acid to mixer 21, about 30% to mixer 22, about 20% to reactor 23 and the remainder to the trough 24 these proportions may be varied so long as the crystals of calcium sulfate are not in contact with the sulfuric acid for too long a period as indicated by a ratio sufficiently high to indicate the presence of incompletely acidulated rock in mixer 23. Another indication is a classifying test which shows the presence of undissolved rock. An indication that the crystals of calcium sulfate have been in contact with the sulfuric acid for too long a period is the formation of large crystals which settle too rapidly and throw too great a load upon the rakes of the thickeners. The slurry discharged from agitator 23 passes by way of trough 24 or any other suitable means to the decanter or thickener 25. The thickener 25, as are thickeners 26, 27, 28, 29 and 30, is provided with a slowly moving rake which moves the thickened slurry, thickened from about 30% solids to about 45% solids, to the center of the thickener or decanter. At the center of the thickener and at the bottom, a wiper is attached to the rakes. This wiper keeps a small cone cut for the reception of three or four tons of thickened slurry. The thickened slurry is pumped from the bottom of decanter 25 and discharged into thickener 26. The thickened slurry in decanter 26 is pumped or otherwise conveyed to decanter 27. The thickened slurry in each of the other decanters 28 and 29 is discharged into the succeeding decanter until the thickened slurry in decanter 30 is pumped to a filter 31 and washed well with water and the filter cake comprised mostly of gypsum is discharged to waste. The water and acid recovered by the filter 31 is returned to decanter 30 and thence in succession passes countercurrent to the thickened slurry through decenters 29, 28 and 27 in succession. From 27 the flow of the increasingly concentrating wash liquor passes to decanter 26 from which the weak phosphoric or return acid of about 18° Bé. is taken to be employed in the treatment of further amounts of phosphatic material. The overflow from decanter 25 is the full strength phosphoric acid of about 26° Bé. which is removed from the system. When desirable, a recirculation system may be incorporated in the well known manner. At such times the gypsum slurry is taken from the top of mixer 23 and pumped to small premixers 32 where the gypsum slurry is treated with strong sulfuric acid in sufficient quantity to raise the free sulfuric acid content of the slurry to 5% or more.

The amount of sulfuric acid introduced into the trough 24 is that amount sufficient to convert the mono-calcium phosphate present to phosphoric acid. It has been found that a contact time of about 10 to about 20 minutes between the discharge of reactor 23 containing mono-calcium phosphate and the sulfuric acid added at that point is preferable although variations related to the conditions existing in treating a particular phosphatic material may be necessary as those skilled in the art will appreciate.

A preferred embodiment of a process for acidulating phosphatic material to produce phosphoric acid by the continuous decantation method involving the principles of the present invention is illustrated in Fig. 3. As in Figs. 1 and 2 the grinding equipment is omitted. All of the phosphatic material and the weak process phosphoric acid is introduced into the first mixer 41. The total amount of sulfuric acid necessary is introduced in four portions. Sufficient acid is introduced into mixers 41, 42 and 43 to provide a discharge from mixer 43 containing mono-calcium phosphate. The discharge from mixer 43 is introduced into a small sizer 52 with sufficient capacity to provide a time of contact sufficient to change the mono-calcium phosphate to phosphoric acid and sufficient to produce crystals of calcium sulfate of optimum size. This time of contact is preferably about 10 to about 20 minutes. From the sizer 52 the liquid mass is conveyed to the decanter 45 by means of a trough or suitable conduit 44. The liquid mass is thickened from about 30% solids to about 45% solids in the decanter 45 from which the liquid overflow 53 is phosphoric acid of suitable strength, say about 26° Bé. The solids are withdrawn from the bottom of the decanter 45 as a thickened slurry and pumped to decanter 46. In succession the solids pass from decanter 46 through decanters 47, 48, 49 and 50 countercurrent to acid and water recovered from the filter 51. The solids comprising principally gypsum are thoroughly washed on the filter 51 and the cake discharged to waste or for use in the arts. The water and acid from the filter passes countercurrent to the solids through decanters 50, 49, 48 and 47 to decanter 46. The overflow from decanter 46 is process acid having a density of about 18° Bé. and is introduced into mixer 41.

An appreciation of problems solved and the advantages derived from the embodiments of the present invention will be obtained when it is considered that for the production of 120 tons of phosphoric acid of 52° Bé. per day, there are approximately 1000 tons of slurry discharge from agitator or mixer 3, 23 or 43 into decanter 5, 25 or 45. The thickened slurry pumped from one decanter or thickener to another amounts to 750 tons per day and 450 tons of water are added at the filter. With 750 tons of thickened slurry to be handled per day, from thickener to thickener, it can readily be appreciated how important it is that the crystals forming the slurry settle normally. For normal settling it is necessary to control the size of the crystals within critical limits. The size of the crystals from easily soluble rock may be controlled in accordance with the principles of the present invention by reducing the time of contact of the calcium sulfate crystals and the sulfuric acid and adding a portion of the acid to the mixers and the remainder before introduction into the decanters.

While the present invention has been described in conjunction with certain preferred embodiments of the principles thereof, it is to be understood that variations and modifications may be made as those skilled in the art will readily appreciate. Such variations and modifications are to be considered within the purview of the specification and the scope of the appended claims.

I claim:

1. In the process of manufacturing phosphoric acid from easily soluble phosphatic material, including washer screenings and the like, by reacting said easily soluble phosphatic material with dilute sulfuric acid, the improvement which comprises reacting a suspension of comminuted easily soluble phosphatic material in weak phosphoric acid with less than the metathetical amount of dilute sulfuric acid to form phosphoric acid but sufficient to form calcium sulphate and mono-calcium phosphate, said less than metathetical amount of dilute H$_2$SO$_4$ retarding the reaction and producing crystals of calcium sulphate having a substantially uniform rate of settling, and thereafter adding in several separate stages further amounts of sulfuric acid sufficient in all to convert said mono-calcium phosphate to phosphoric acid and to form additional calcium sulphate, and maintaining in the final stage said calcium sulphate in contact with sulphuric acid for a period of time sufficient to form crystals of gypsum having the 70 to 80% test, whereby clear overflows and easily pumped sludges are produced and overloading of rakes in decanters is avoided.

2. In the process of manufacturing phosphoric acid by the continuous counter-current decantation method by reacting easily soluble phosphatic material with sulfuric acid, the improvement which comprises reacting in a first operation a suspension of comminuted easily soluble phosphatic material in phosphoric acid and water with an amount of sulfuric acid equal to about 80% of the amount theoretically required to convert to phosphoric acid all of the phosphatic material added in said first operation thereby producing phosphates including some mono-calcium phosphate and crystals of calcium sulfate; thereafter, in a second operation, adding an amount of comminuted easily soluble phosphatic material approximately equal to the amount of phosphatic material added in the first operation and an amount of sulfuric acid equal to about 75% of the amount of sulfuric acid added in said first operation thereby producing more phosphates including mono-calcium phosphate and more crystals of calcium sulfate; thereafter, in a third operation, adding an amount of sulfuric acid equal to about 50% of the amount of sulfuric acid added in said first operation thereby forming additional calcium sulfate crystals; agitating the reacting mass throughout the aforesaid operations to keep said materials in suspension; thereafter, in a fourth operation, adding an amount of sulfuric acid equal to at least 25% of the amount of sulfuric acid added in said first operation to convert substantially all of the phosphates including the mono-calcium phosphate and residual phosphatic material to phosphoric acid and to form further calcium sulfate crystals; regulating the time of contact in each of said first three operations and then maintaining, after said final sulfuric acid addition, said calcium sulfate crystals in contact with said sulfuric acid for about 10 to about 20 minutes to form crystals of calcium sulfate having an optimum size for settling; and then passing the same to decanters.

3. In the process of manufacturing phosphoric acid by the continuous counter-current decantation method by reacting easily soluble phosphatic material with sulfuric acid, the improvement which comprises reacting in a first operation a suspension of comminuted easily soluble phosphatic material in phosphoric acid and water with an amount of sulfuric acid equal to about 80% of the amount theoretically required to convert to phosphoric acid all of the phosphatic material added in said first operation thereby producing phosphates including some mono-calcium phosphate, and crystals of calcium sulfate; thereafter, in a second operation, adding an amount of comminuted easily soluble phosphatic material approximately equal to the amount of phosphatic material added in the first operation and an amount of sulfuric acid equal to about 75% of the amount of sulfuric acid added in said first operation, thereby producing more phosphates including mono-calcium phosphate and more crystals of calcium sulfate; thereafter, in a third operation, adding an amount of sulfuric acid equal to about 50% of the amount of sulfuric acid added in said first operation thereby forming additional calcium sulfate crystals; agitating throughout the aforesaid operations to keep said materials in suspension; thereafter, in a fourth operation, adding an amount of sulfuric acid equal to at least 25% of the amount of sulfuric acid added in said first operation to convert substantially all the phosphates including mono-calcium phosphate and residual phosphatic material to phosphoric acid and to form further calcium sulfate crystals; regulating the time of contact in each operation and maintaining said crystals of calcium sulfate formed in the aforesaid operations in contact with sulfuric acid for a period of time sufficient to produce crystals of calcium sulfate of optimum size for settling; and then passing the same to decanters.

4. In the process of manufacturing phosphoric acid by the continuous counter-current decantation method by reacting phosphatic material with sulfuric acid, the improvement which comprises reacting in a first operation a suspension of comminuted phosphatic material in phosphoric acid and water with a quantity of sulfuric acid insufficient in amount to convert all of said phosphatic material to phosphoric acid but sufficient to produce phosphates including some mono-calcium phosphate and crystals of calcium sulfate; thereafter, in a second and in a third operation, adding further portions of sulfuric acid in amounts still insufficient to convert all of said phosphatic material to phosphoric acid whereby more calcium sulfate crystals are formed; thereafter, in a fourth operation, adding an amount of sulfuric acid at least sufficient to convert substantially all the phosphates including mono-calcium phosphate formed and residual phosphatic material to phosphoric acid and to form additional crystals of calcium sulfate; agitating said material in each successive operation whereby the crystals of calcium sulfate already formed are given an opportunity to increase in size; regulating the time of contact of calcium sulfate crystals with sulfuric acid in each of the first three operations and maintaining such time of contact in the fourth operation for a period of about 10 to about 20 minutes whereby calcium sulfate crystals of optimum size for settling are produced; and then passing the same to decanters.

5. In the continuous counter-current decantation process of manufacturing phosphoric acid by reacting phosphate rock with sulfuric acid, the improvement which comprises establishing a suspension containing phosphate rock, phosphoric acid, calcium sulfate and water, and, in a first stage, adding thereto a quantity of sulfuric acid insufficient in amount to convert all of said phosphate rock to phosphoric acid but sufficient to produce phosphates including some mono-calcium phosphate and crystals of calcium sulfate; thereafter, in a second stage, adding further amounts of phosphate rock and of sulfuric acid in such proportion that the amount of sulfuric acid added is insufficient to convert all of the phosphate rock to phosphoric acid but is sufficient to produce more phosphates including mono-calcium phosphate and more crystals of calcium sulfate; thereafter, in at least a third stage, adding an additional amount of sulfuric acid but an amount still insufficient to convert all of the phosphate rock to phosphoric acid whereby further calcium sulfate crystals are formed; then, in a subsequent stage, adding at least sufficient sulfuric acid to convert substantially all of said phosphates including the mono-calcium phosphate and residual phosphatic material to phosphoric acid and to form additional calcium sulfate crystals; re-circulating part of the material entering said subsequent stage to furnish calcium sulfate crystals to the suspension in said first stage; and throughout regulating the time of contact in each stage and maintaining said crystals of calcium sulfate formed in the aforesaid stages in contact with sulfuric acid for a period of time sufficient to produce crystals of calcium sulfate of optimum size for settling.

6. In the process of manufacturing phosphoric acid in the continuous counter-current decantation method by reacting easily soluble phosphatic material with sulfuric acid, the improvement which comprises reacting in a first stage a suspension of comminuted easily soluble phosphatic material in phosphoric acid and water with an amount of sulfuric acid insufficient to convert all of said phosphatic material to phosphoric acid but sufficient to produce phosphates including some mono-calcium phosphate and crystals of calcium sulfate; thereafter, in a second stage, adding further amounts of phosphatic material and of sulfuric acid in such proportion that the amount of sulfuric acid added is insufficient to convert all of the phosphatic material to phosphoric acid but is sufficient to form more phosphates including mono-calcium phosphate and more crystals of calcium sulfate; thereafter, in at least a third stage, adding an additional amount of sulfuric acid but an amount still insufficient to convert all of the phosphatic material to phosphoric acid whereby further calcium sulfate crystals are formed; then, in a subsequent stage, adding at least sufficient sulfuric acid to convert substantially all of said phosphates including the mono-calcium phosphate and residual phosphatic material to phosphoric acid and to form additional calcium sulfate crystals; and throughout the stages regulating the time of contact in each stage and maintaining said crystals of calcium sulfate formed in the aforesaid stages in contact with sulfuric acid for a period of time sufficient to produce crystals of calcium sulfate of optimum size for settling.

GEORGE F. MOORE.